(12) United States Patent
Mahmoudian et al.

(10) Patent No.: US 11,555,487 B2
(45) Date of Patent: Jan. 17, 2023

(54) CAPACITIVE LIQUID LEAK DETECTION DEVICE

(71) Applicant: Haskel International, LLC, Burbank, CA (US)

(72) Inventors: Pooya Mahmoudian, Glendale, CA (US); Richard Gillberg, Jr., Encinitas, CA (US)

(73) Assignee: Haskel International, LLC, Burbank, CA (US)

( * ) Notice: Subject to any disclaimer, the term of this patent is extended or adjusted under 35 U.S.C. 154(b) by 65 days.

(21) Appl. No.: 16/283,134

(22) Filed: Feb. 22, 2019

(65) Prior Publication Data

US 2020/0271110 A1    Aug. 27, 2020

(51) Int. Cl.
*F04B 1/0443* (2020.01)
*G01M 3/16* (2006.01)
(Continued)

(52) U.S. Cl.
CPC .......... *F04B 1/0443* (2013.01); *F04B 9/1095* (2013.01); *F04B 49/065* (2013.01); *F04B 53/16* (2013.01); *G01M 3/16* (2013.01); *F04B 49/10* (2013.01); *F04B 2201/0803* (2013.01); *F04B 2207/70* (2013.01); *G01F 23/263* (2013.01)

(58) Field of Classification Search
CPC .......... F04B 9/10; F04B 53/16; F04B 53/164; F04B 39/1073; F04B 49/065; F04B 37/12; F04B 51/00; F04B 53/144; F04B 9/1095; F04B 49/10; F04B 2207/70; F04B 2201/0803; G01M 3/16; G01F 23/263; G01F 23/26; F15B 20/005; F15B 19/005;
(Continued)

(56) References Cited

U.S. PATENT DOCUMENTS

| 4,573,343 A | 3/1986 | Huiber |
| 5,148,699 A * | 9/1992 | Morse ..................... E21B 33/08 |
| | | 166/84.1 |

(Continued)

FOREIGN PATENT DOCUMENTS

| CH | 131655 A | * | 2/1929 | ............ F04B 35/008 |
| CH | 359504 A | * | 1/1962 | .............. F04B 9/105 |

(Continued)

OTHER PUBLICATIONS

English Abstractor FR-2965049-A1 (Year: 2012).*
Extended European Search Report for European Patent Application No. 20158867.0 dated May 18, 2020, 10 pages.

*Primary Examiner* — Nathan C Zollinger
(74) *Attorney, Agent, or Firm* — Edell, Shapiro & Finnan, LLC

(57) ABSTRACT

A liquid leak detector for a pump is described. The liquid leak detector is mountable on a pump to detect leaked fluid coming from the pump. The leak detector includes a buffer tube positioned on the pump to collect a leaked fluid from the pump and a sensor positioned on the buffer tube to detect the level of leaked fluid in the buffer tube and to generate a signal when the leaked fluid reaches a maximum fluid level. A purge line on the buffer tube removes leaked drive fluid from the buffer tube once the leaked drive fluid reaches a maximum level. Logic connected to the sensor receives the signal from the detector and generates an alarm.

20 Claims, 5 Drawing Sheets

(51) Int. Cl.
  *F04B 49/06* (2006.01)
  *F04B 53/16* (2006.01)
  *F04B 49/10* (2006.01)
  *F04B 9/109* (2006.01)
  *G01F 23/263* (2022.01)

(58) Field of Classification Search
  CPC ... F15B 15/1452; F15B 15/149; F16J 15/004; F16J 15/3492
  See application file for complete search history.

(56) References Cited

U.S. PATENT DOCUMENTS

| | | | | |
|---|---|---|---|---|
| 6,068,448 | A * | 5/2000 | Muratsubaki | F04B 3/00 417/212 |
| 6,295,869 | B1 * | 10/2001 | Delatte | G01F 23/268 361/284 |
| 9,644,638 | B2 * | 5/2017 | Kushnarev | F04D 29/628 |
| 2002/0106292 | A1 * | 8/2002 | Chowaniec | F04B 9/105 417/403 |
| 2003/0015840 | A1 * | 1/2003 | Davis | G01M 3/2869 277/320 |
| 2016/0298614 | A1 * | 10/2016 | Gaillard | F04B 53/16 |
| 2018/0045597 | A1 * | 2/2018 | Farnsworth | B24C 7/0007 |
| 2019/0024682 | A1 * | 1/2019 | Walton | F15B 15/1433 |

FOREIGN PATENT DOCUMENTS

| | | | | |
|---|---|---|---|---|
| FR | 2965049 | A1 * | 3/2012 | G01F 23/265 |
| WO | 2007000189 | A1 | 1/2007 | |

* cited by examiner

CAPACITIVE LIQUID LEAK DETECTION DEVICE

TECHNICAL FIELD

The present disclosure is directed pumps and more specifically to an apparatus and method for detecting oil leakage in a pump.

BACKGROUND OF THE INVENTION

Booster pumps may be used to increase the pressure of a fluid, such as gas. A booster generally comprises one or more stages having a piston housed within a cylinder that is driven by a motor to compress gas in the cylinder. This may thereby increase the pressure of the gas in the cylinder. The motor of the booster is typically driven by a pneumatic, hydraulic or electric linear actuated assembly.

In those pumps oil can exist in the casing separated from the boost gas or liquid by a seal. The oil can be the drive mechanism in the case of a hydraulic pump or can be used for lubrication and/or cooling in the pneumatic or electric pump drive. Certain issues may cause the oil to leak from the casing, such as worn seals or cracks in the casing itself. Detection of the oil leakage and particularly a threshold amount of oil leakage can would allow an alarm to be sent indicating that the pump needs maintenance or service.

Accordingly, what is needed is a leak detection system and method for detecting oil leaks in pumps.

BRIEF SUMMARY OF THE INVENTION

The concepts herein describe a system and method for detecting fluid leaks in pumps. In a preferred embodiment a pump having leak detection includes at least one pump cylinder having a pump chamber with an inlet and an outlet and a piston actuatable within the pump cylinder to draw a working fluid into the pump chamber through the inlet and to push the working fluid out of the pump chamber through the outlet. A drive is configured to move the piston and includes a drive fluid that is prevented from entering the pump chamber by a seal. A leak detector is positioned on the pump to capture drive fluid leaking from the drive, where the leak detector operable to generate an alarm when the leaked drive fluid reaches a threshold.

In preferred embodiments the liquid leak detector for the pump includes a buffer tube positioned on the pump to collect a leaked fluid from the pump and a sensor positioned on the buffer tube to detect the level of leaked fluid in the buffer tube and to generate a signal when the leaked fluid reaches a maximum fluid level. A purge line removes leaked drive fluid from the buffer tube once the leaked drive fluid reaches a maximum level and logic connected to the sensor to receives the signal and generates an alarm.

Preferred embodiments of a method of detecting a leaked drive fluid in a pump are also described. The preferred embodiments of the method include collecting the leaked drive fluid from the pump in a buffer tube and defining a maximum level of leaked drive fluid in the buffer tube using a purge line on the buffer. The method further includes sensing when the leaked drive fluid reaches the maximum level using a sensor on the buffer tube and generating an alarm.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
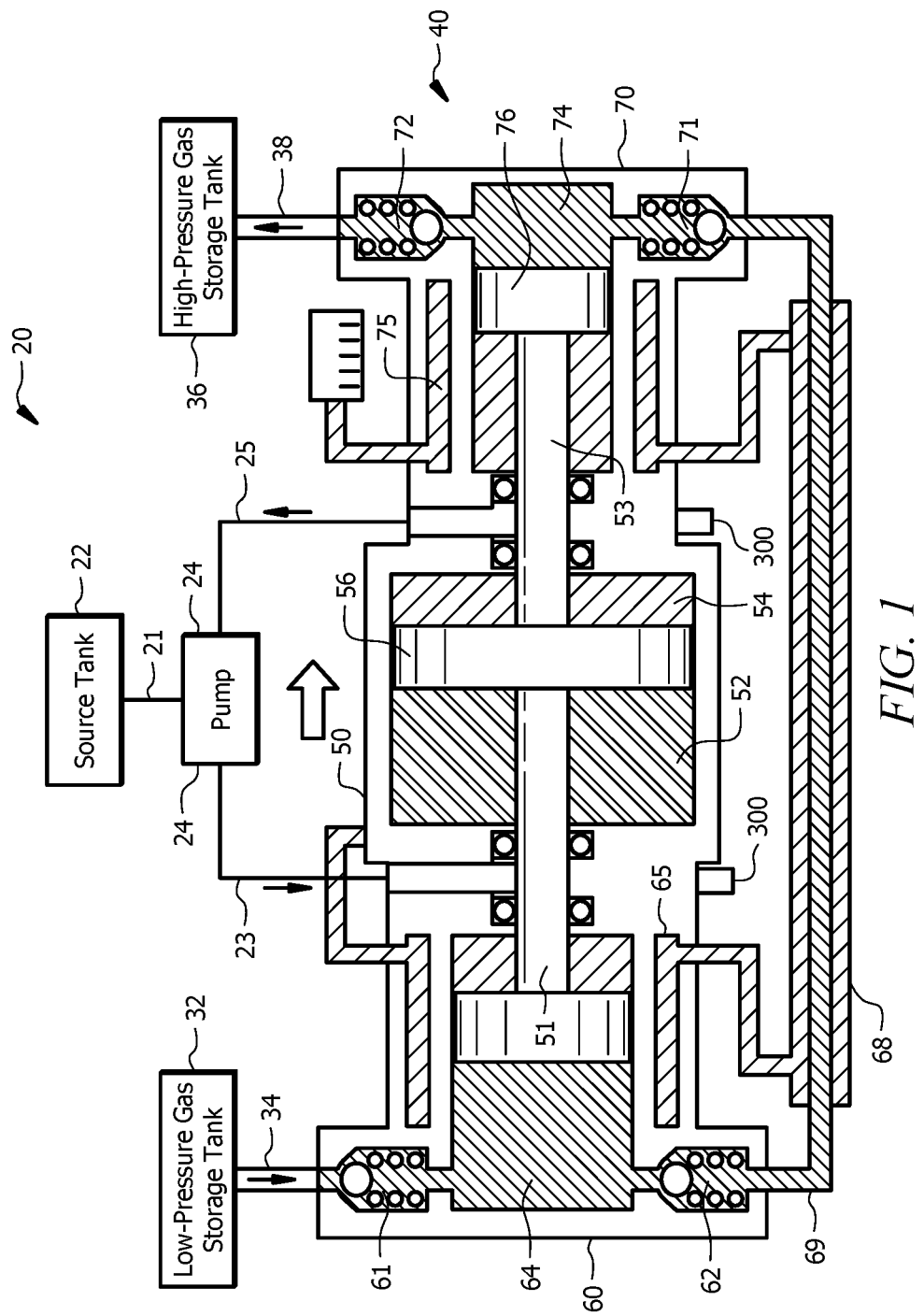
FIG. 1 depicts a preferred embodiment of a schematic of a preferred embodiment of a two-stage hydraulically actuated gas booster that includes leak detection.

An example of a hydraulic two-stage booster (40) is shown with reference to FIG. 1. The booster pump 49 comprises a low-pressure piston (66) housed within a low-pressure cylinder (60) and a high-pressure piston (76) housed within a high-pressure cylinder (70). Each of these pistons (66, 76) may be actuated by a motor (50) comprising a drive piston (56). In the illustrated embodiment, the low-pressure piston (66) is coupled to the drive piston (56) by a low-pressure rod (51) and the high-pressure piston (76) is coupled to the drive piston (56) by a high-pressure rod (53). Accordingly, when the drive piston (56) is translated to the right, toward the high-pressure cylinder (70), the low-pressure piston (66) may be actuated to the right by the low-pressure rod (51), into the low-pressure cylinder (60), to draw gas from a low-pressure gas storage tank (32) at a low pressure into the low-pressure gas chamber (64) of the low-pressure cylinder (60) through inlet piping (34) and a low-pressure inlet check valve (61). The drive piston (56) may then be translated to the left, toward the low-pressure cylinder (60), which may actuate the low-pressure piston (66) to the left, outward in the low-pressure cylinder (60), to compress the gas in the low-pressure gas chamber (64) to an intermediate pressure and to push the gas out of the low-pressure gas chamber (64) through a low-pressure outlet check valve (62). The gas may then travel through intermediate piping (69) to the high-pressure cylinder (70). As the low-pressure piston (66) is actuated to the left, the high-pressure piston (76) may also be actuated to the left by the high-pressure rod (53), into the high-pressure cylinder (70) to draw gas from the intermediate piping (69) into the high-pressure gas chamber (74) of the high-pressure cylinder (70) through a high-pressure inlet check valve (71). The drive piston (56) may then be translated to the right again, toward the high-pressure cylinder (70). This again may actuate the low-pressure piston (66) to the right, into the low-pressure cylinder (60), to draw gas from a low-pressure gas storage tank (32) into the low-pressure gas chamber (64) of the low-pressure cylinder (60). The high-pressure piston (76) may also be translated to the right by the high-pressure rod (53), outward in the high-pressure cylinder (70), to compress the gas in the high-pressure gas chamber (74) to a high pressure and to push the gas out of the high-pressure gas chamber (74) through a high-pressure outlet check valve (72) and to a high-pressure gas storage tank (36) through outlet piping (38). The pistons (56, 66, 76) can continue to cycle to thereby produce a stream of high-pressure gas from the booster (40). In some versions, a heat exchanger (68, 78) and/or cooling jackets (65, 75) are provided around the intermediate piping (69) and/or the gas cylinders (60, 70) to cool the gas.

The motor (50) of such boosters (40) are typically driven by a separate pneumatic or a hydraulic system. For instance, FIG. 1 shows an example of a separate drive system (20) for a booster (40), which comprises a source tank (22) coupled to a drive pump (24) by drive piping (21). The drive pump (24) may then be coupled to a first chamber (52) of the motor (50), adjacent to the low-pressure cylinder (60), by first piping (23) and to a second chamber (54) of the motor (50), adjacent to the high-pressure cylinder (70), by second piping (25). The source tank (22) comprises a fluid, either air or hydraulic fluid, that may be pumped to either the first chamber (52) or the second chamber (54) of the motor (50) by the drive pump (24) to actuate the motor (50). Accordingly, when the drive pump (24) pumps the fluid into the first chamber (52), the drive piston (56) may be translated to the right, toward the high-pressure cylinder (70). When the drive pump (24) pumps fluid into the second chamber (54), the drive piston (56) may be translated to the left, toward the low-pressure cylinder (60). Fluid may be discharged from the chambers (52, 54) and returned to the source tank (22) and/or vented to the atmosphere.

Where rods (51) and (53) interface with chambers (52) and (54), the fluid in chambers (52) and (54) may leak into the casing. When the amount of fluid leaked becomes significant, the booster (40) may lose efficiency or malfunction. In order to detect the fluid leakage before it reaches the level that may impact performance or operation a fluid leak sensor (300), according to the concepts described herein, is placed in or on the casing where the leaked fluid would accumulate. The fluid leak sensor (300) is operable to detect when the level of leaked fluid reaches a threshold and trigger an alarm. The booster (40) may them be serviced and returned to operation before any damage occurs.

Figure 2:
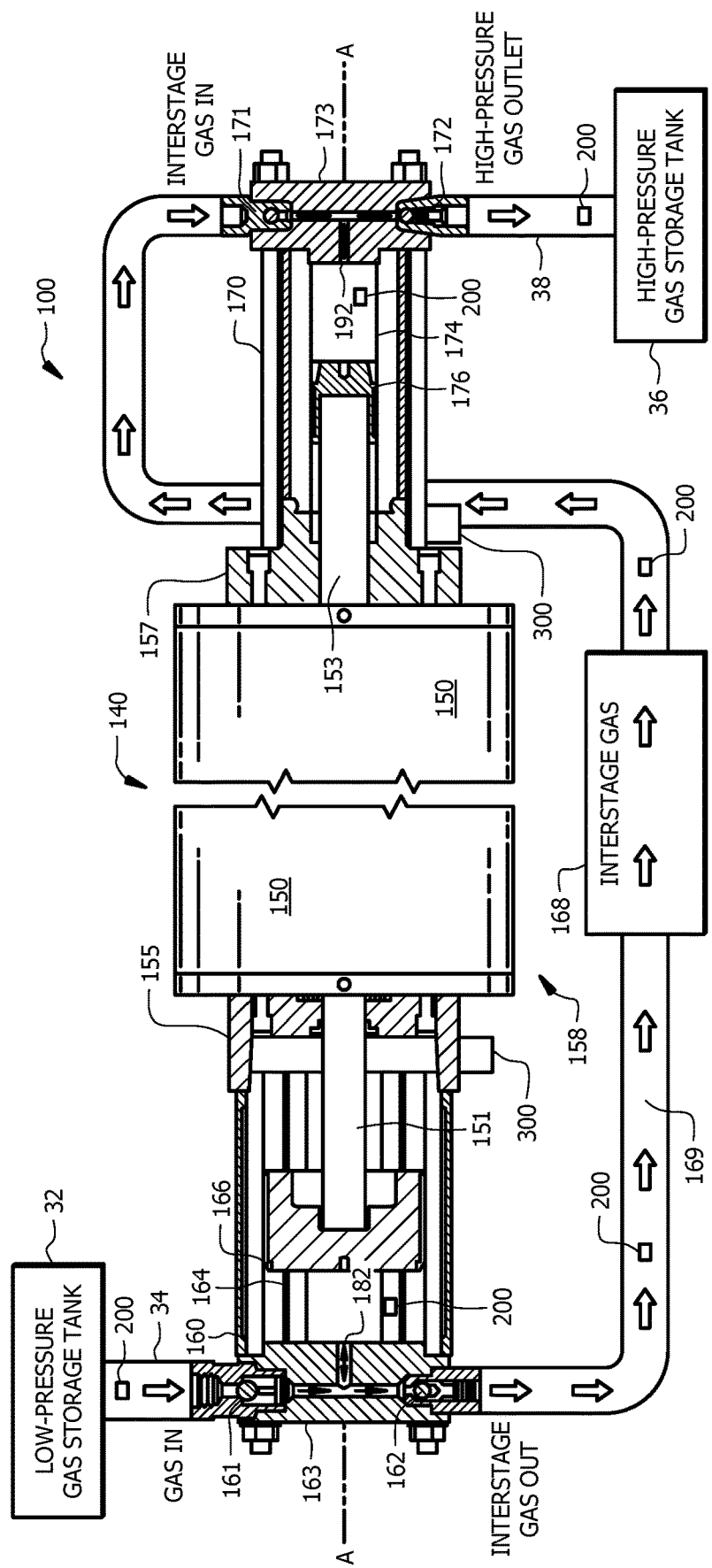
FIG. 2 depicts a schematic of a preferred embodiment of a two-stage electrically actuated gas booster that includes leak detection.
Figure 3:
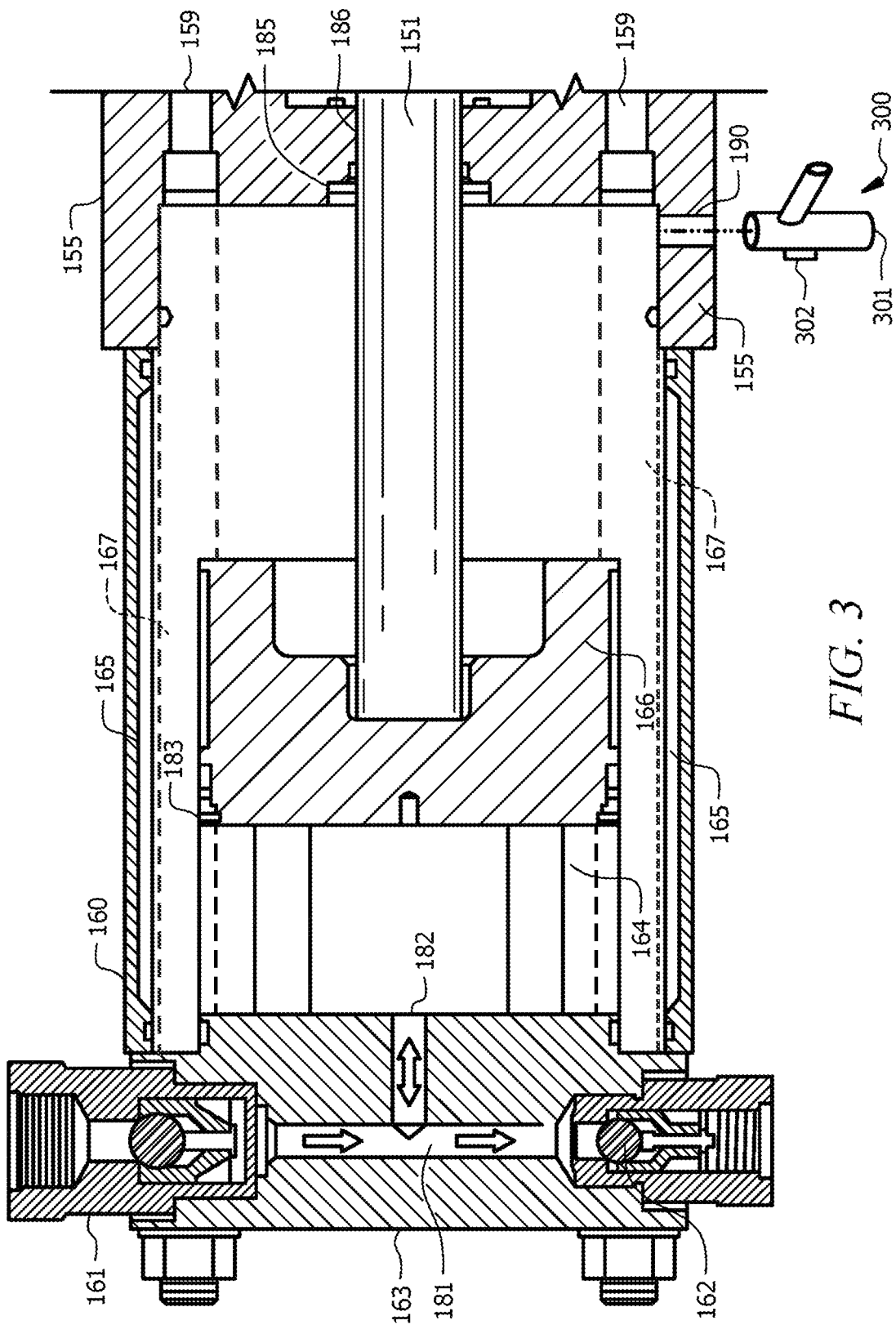
FIG. 3 depicts a cross-sectional view of a low-pressure cylinder of the electric driven gas booster of FIG. 2 and includes a preferred embodiment of a leak detection device according to the concepts described herein.
Figure 4:
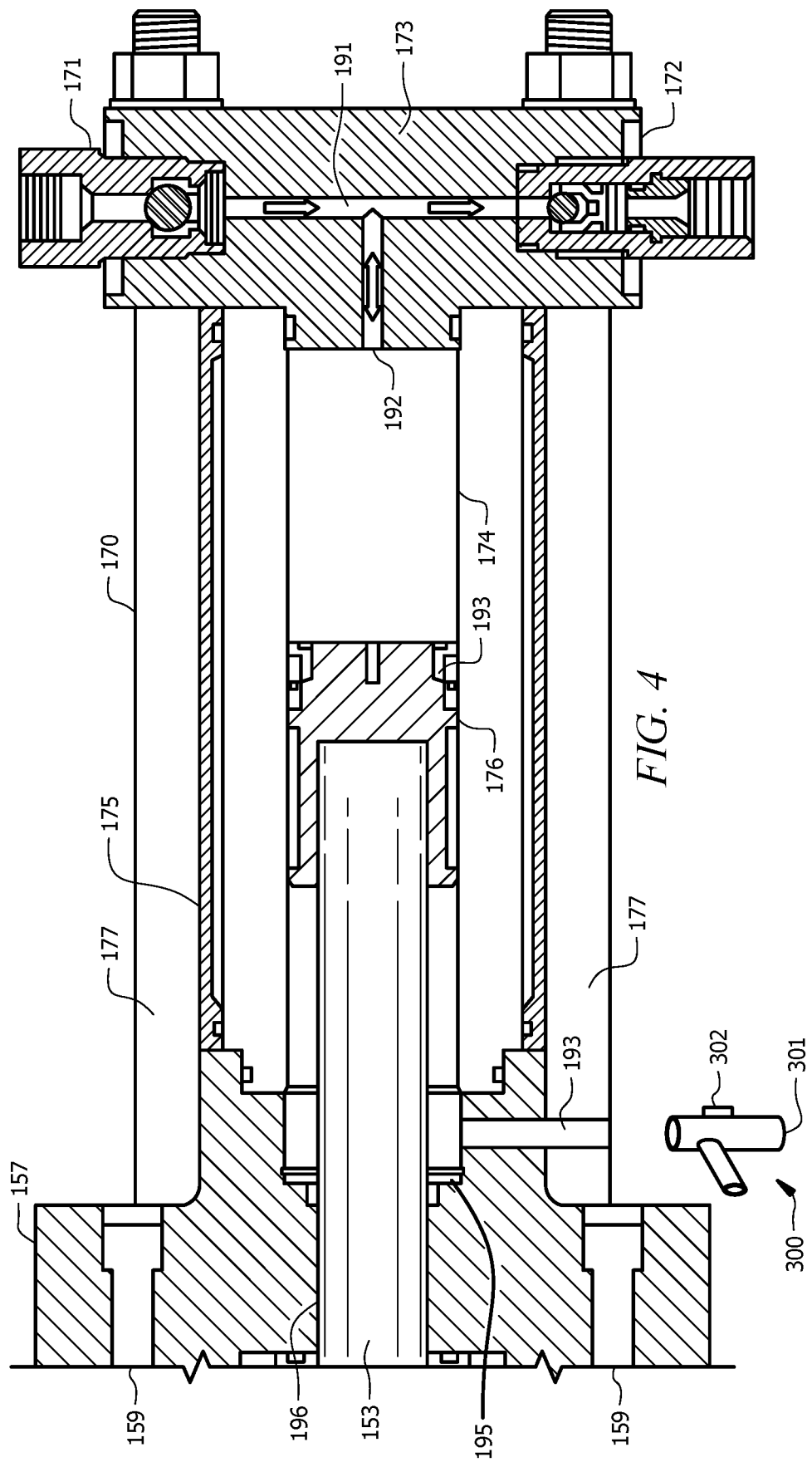
FIG. 4 depicts a cross-sectional view of a high-pressure cylinder of the electric driven gas booster of FIG. 2 and includes a preferred embodiment of a leak detection device according to the concepts described herein.

In addition to hydraulic boosters, electric driven boosters can also suffer from fluid leakage. Referring now to FIGS. 2, 3 and 4, an exemplary gas booster assembly using an electric driven gas booster is described. For instance, the gas booster assembly (100) comprises a gas booster (140) coupled with a controller (not shown). The gas booster (140) of the illustrated embodiment comprises two-stages having a low-pressure cylinder (160) and a high-pressure cylinder (170) actuated by an electric motor (150). It should be noted that while a two-stage gas booster (140) is described, any suitable number of one or more stages can be used.

Motor (150) comprises a housing (158) that is substantially cylindrical with a first end coupled with the low-pressure cylinder (160) and a second end coupled with the high-pressure cylinder (170). A drive is then positioned within the housing (158) that is configured to convert electrical energy into linear motion. For instance, the drive may comprise a ball screw drive having a ball screw and a ball nut with recirculating ball bearing that can thereby convert electrical energy to rotary motion and then to linear motion.

A first end of the drive is coupled to the low-pressure cylinder (160) via the low-pressure rod (151), and a second end of the drive is coupled to the high-pressure cylinder (170) via the high-pressure rod (153), to actuate the booster (140). Still other suitable configurations for driving the motor (150) will be apparent to one with ordinary skill in the art in view of the teachings herein.

Similarly to the hydraulic booster of FIG. 1, embodiments of the electric driven booster 140 have fluid leak sensors placed on housing 158 to collect leaked fluid. Fluid leak sensors 300 collect leaked fluid and trigger an alarm when the level of leaked fluid reaches a threshold amount.

Referring more specifically to FIG. 3, the low-pressure cylinder (160) comprises a low-pressure piston (166) coupled to the other end of the low-pressure rod (151) that translates between a low-pressure end cap (163) and a low-pressure seal adapter (155) of the low-pressure cylinder (160). A low-pressure chamber (164) is defined between the low-pressure piston (166) and the low-pressure end cap (163). In present embodiment, the low-pressure end cap (163) comprises a low-pressure inlet check valve (161) that allows gas to flow into the low-pressure cylinder (160) from a low-pressure gas storage tank (32), but not to flow out of the low-pressure cylinder (160). The low-pressure end cap (163) further comprises a first conduit (181) with a first end coupled with the low-pressure inlet check valve (161) and a second end coupled with a low-pressure outlet check valve (162) that allows gas to flow out of the low-pressure cylinder (160), but not into the low-pressure cylinder (160). A second conduit (182) is coupled with the first conduit (181) in the low-pressure end cap (163) between the check valves (161, 162) having an outlet to the low-pressure chamber (164) that allows gas to flow between the low-pressure chamber (164) and the first conduit (181). The low-pressure end cap (163) is attached to the low-pressure seal adapter (155) of the low-pressure cylinder (160) by tie rods (167) and, in turn, the low-pressure seal adapter (155) is attached to the housing (158) with couplings (159). In some versions, the low-pressure cylinder (160) comprises a cooling jacket (165) positioned around the low-pressure cylinder (160) to lower the temperature of the gas within the low-pressure cylinder (160).

Fluid leakage around seal (185) would flow down to the inner surface of seal adapter (155). Channel (190) provides a flow path for the leaked fluid to leak detector (300). As will be described in greater detail with reference to FIG. 5, leaked fluid drains through channel (190) and collects in liquid buffer tube (301). When the leaked fluid level reaches a threshold, switch (302) detects the fluid level and generates a signal to a controller or logic device.

The high-pressure cylinder (170) is shown in more detail in FIG. 4. The high-pressure cylinder (170) is similar to the low-pressure cylinder (160) and comprises a high-pressure piston (176) coupled to the other end of the high-pressure rod (153) that translates between a high-pressure end cap (173) and a high-pressure seal adapter (157) of the high-pressure cylinder (170). A high-pressure chamber (174) is defined between the high-pressure piston (176) and the high-pressure end cap (173). In present embodiment, the high-pressure end cap (173) comprises a high-pressure inlet check valve (171) that allows gas to flow into the high-pressure cylinder (170) from the low-pressure cylinder (160), but not to flow out of the high-pressure cylinder (170). The high-pressure end cap (173) further comprises a first conduit (191) with a first end coupled with the high-pressure inlet check valve (171) and a second end coupled with a high-pressure outlet check valve (172) that allows gas to flow out of the high-pressure cylinder (170), but not into the high-pressure cylinder (170). A second conduit (192) is coupled with the first conduit (191) in the high-pressure end cap (173) between the check valves (171, 172) having an outlet to the high-pressure chamber (174) that allows gas to flow between the high-pressure chamber (174) and the first conduit (191). The high-pressure end cap (173) is attached to the high-pressure seal adapter (157) of the high-pressure cylinder (170) by tie rods (177) and, in turn, the high-pressure seal adapter (157) is attached to the housing (158) with couplings (159). While four tie rods (177) are shown in the illustrated embodiment, any other suitable number of tie rods (177) can be used. In some versions, the high-pressure cylinder (170) comprises a cooling jacket (175) positioned around the high-pressure cylinder (170) to lower the temperature of the gas within the high-pressure cylinder (170). As described above, fluid leaking around rod (153) and seal (195) flows to channel (193) in high-pressure seal adapter (157). It passes through channel (193) and to fluid leak detector 300 as described with reference to the low pressure cylinder above.

An example of a flow path for operating the booster (140) is also shown. In the illustrated embodiment, the drive (156) may be electrically actuated by the controller (110) to translate the drive (156) to the right, toward the high-pressure cylinder (170), to thereby actuate the low-pressure piston (166) to the right by the low-pressure rod (151), into the low-pressure cylinder (160). This may draw gas from the low-pressure gas storage tank (32) at a low pressure into the low-pressure gas chamber (164) of the low-pressure cylinder (160) through inlet piping (34) and the low-pressure inlet check valve (161). The drive (156) may then be electrically actuated by the controller (110) to translate the drive (156) in the opposite direction to the left, toward the low-pressure cylinder (160). This may actuate the low-pressure piston (166) to the left, outward in the low-pressure cylinder (160), to compress the gas in the low-pressure gas chamber (164) to an intermediate pressure and to push the gas out of the low-pressure gas chamber (164) through the low-pressure outlet check valve (162). The gas may then travel through intermediate piping (169) and the heat exchanger (168) to the high-pressure cylinder (170). As the low-pressure piston (166) is actuated to the left, the high-pressure piston (176) may also be actuated to the left by the high-pressure rod (153), into the high-pressure cylinder (170), to draw gas from the intermediate piping (169) into the high-pressure gas chamber (174) of the high-pressure cylinder (170) through the high-pressure inlet check valve (171).

The drive (156) may then be electrically actuated by the controller (110) to translate the drive (156) to the right again, toward the high-pressure cylinder (170). This again may actuate the low-pressure piston (166) to the right, into the low-pressure cylinder (160), to draw gas from the low-pressure gas storage tank (32) into the low-pressure gas chamber (164) of the low-pressure cylinder (160). The high-pressure piston (176) may also be translated to the right by the high-pressure rod (153), outward in the high-pressure cylinder (170), to compress the gas in the high-pressure gas chamber (174) to a high pressure and to push the gas out of the high-pressure gas chamber (174) through the high-pressure outlet check valve (172) and to a high-pressure gas storage tank (36) through outlet piping (38). In the illustrated embodiment, the low-pressure cylinder (160), the motor (150), and the high-pressure cylinder (170) are aligned along a longitudinal axis (A). Accordingly, the motor (150) is configured to actuate the pistons (166, 176) along the longitudinal axis (A) via rods (151, 153). The pistons (156, 166, 176) can continue to cycle to thereby produce a stream of high-pressure gas from the booster (140). In some versions, the booster (140) can increase gas pressure from about 100 psi to about 7,000 psi and may be operated between about 0 to about 50 cycles per minute with a maximum temperature of about 300° F. For instance, the pressure of the gas exiting the low-pressure cylinder (160) may be about 808 psi, and the pressure of the gas exiting the high-pressure cylinder (170) may be about 6795 psi. Still other suitable configurations for operating the booster (140) will be apparent to one with ordinary skill in the art in view of the teachings herein.

Figure 5:
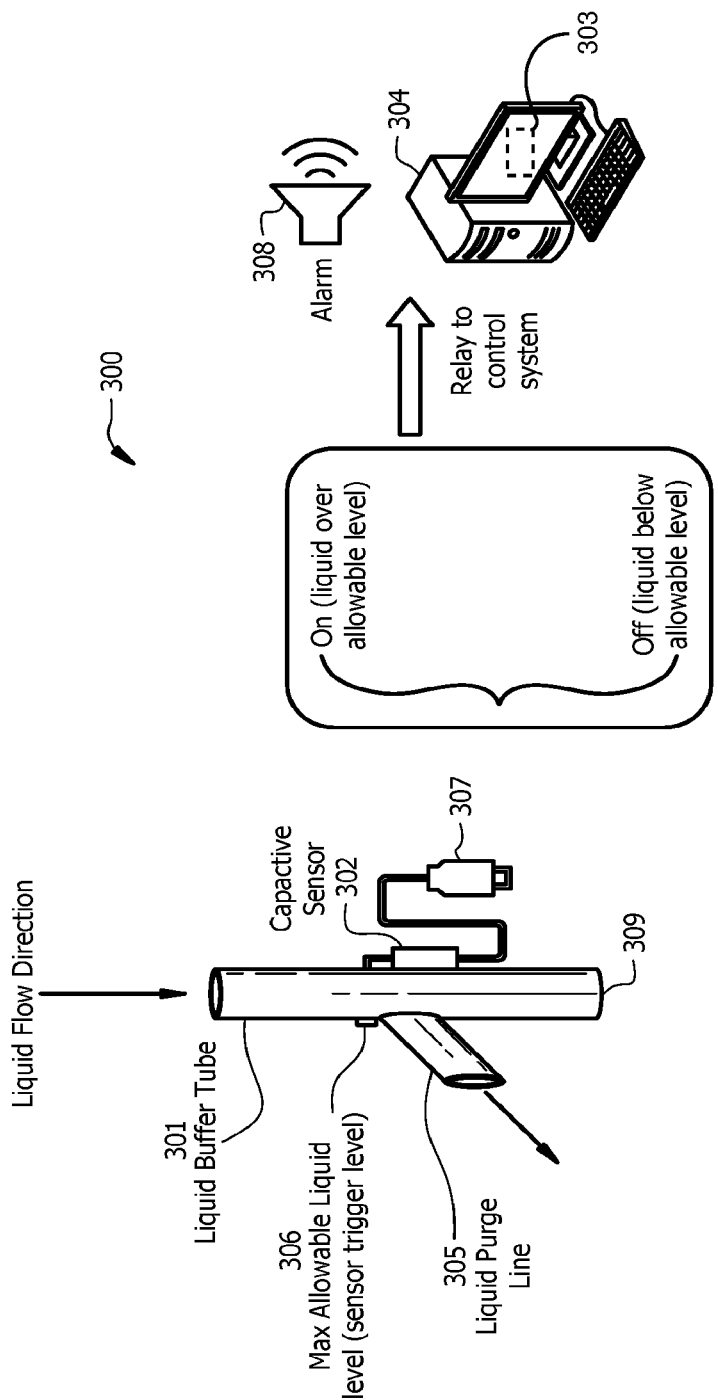
FIG. 5 depicts a schematic of a preferred embodiment of a leak detection device according to the concepts described herein.

Referring now to FIG. 5, a preferred embodiment of a fluid leak detector (300) according to the concepts described herein is shown. While other components may be used, a preferred embodiment uses a vertical liquid buffer tube (301) that includes a liquid purge line (305) and a capacitive liquid level detector (302). As liquid enters the buffer tube (301) it fills the tube until reaches a max level (306) defined by the liquid purge line (305). Level detector (302) is positioned or calibrated to detect when the liquid reaches the max level (306). Level detector may be powered and/or send signals using connector 307, which may be a micro USB connector or other similar connector.

Upon detecting fluid, the level detector (302) sends a signal to logic (303) which may be stand alone logic associated with the level detector (302) or may be part of a controller associated with the booster. Logic (303), upon receiving the signal from level detector (302), generates an alarm that is sent to and/or displayed at the booster controller, and/or may be send to a separate control system (304) that is in communication with the booster system. Other indicators (308) such as visual or audible indicators may also be used to draw attention to the alarm condition.

As used herein, the maximum allowable leakage refers to the maximum volume of liquid that is allowed to leak and accumulated in the device while the max allowable liquid level (306) is a vertical height in reference with the bottom of the vertical liquid buffer tube. When the liquid reaches the max level (306), the max allowable leakage is achieved.

The capacitive liquid level detector (302) is preferably a capacitive sensor/switch that can be designed to be powered with an external power supply. The sensor can be set to be normally closed or normally opened depending on an end user's application. The capacitive sensor detection frequency is adjusted to precisely detect the specific liquid being detected and is installed on the liquid buffer tube (301). The tube material must allow the capacitive sensor to detect the liquid inside it with no signal interruption or reduction. Location of the sensor (302) on the buffer tube (301) can be adjusted by the user based on the amount of allowable leakage. As described, the liquid is accumulated in the liquid buffer tube (301). The max allowable liquid level (306) can be adjusted by the user based on the maximum allowable leakage by either physically moving the sensor (302) on the buffer tube (301) or by tuning the sensor (302) depending on the type of sensor used. Purge line (305) location can also preferably be adjusted by the end user at the max allowable liquid level (306) on the liquid buffer tube (301) by physically sliding the purge line (305) relative to the buffer tube (301) or by raising or lowering the bottom (309) of tube (301).

As described, the capacitive sensor (302) triggers when the liquid fills the liquid buffer tube (301) to the max allowable liquid level (306). The sensor trigger (302) will activate a relay or send a signal that can be tied to an alarm or relay system for further analysis or equipment control system. While the sensor is in the triggered condition, the additional fluid reaching the liquid buffer tube (301) will leave through the liquid purge line (305). Once the liquid level is reduced to below the max allowable liquid level (306), the sensor (302) will return to its normal condition and the alarm/relay will be turned off.

While a capacitive sensor has been described, other types of sensors may be used without departing from the scope of the concepts described herein. Any sensor that can detect a fluid reaching a predetermined level can be used as can sensors that detect the actual liquid level in a reservoir. Further, while hydraulic and electrically actuated pumps have been used as examples, the concepts described herein can be applied to any number of types of pumps, but particularly to actuated pumps where the actuator is submerged in oil.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A pump comprising:
    at least one pump cylinder comprising:
        a pump chamber, wherein the pump chamber comprises an inlet and an outlet, and
        a piston actuatable within the pump cylinder, wherein the piston is configured to draw a working fluid into the pump chamber through the inlet and to push the working fluid out of the pump chamber through the outlet;
    a drive configured to move the piston, wherein the drive includes a drive housing that houses a drive fluid, the drive fluid prevented from exiting the drive housing towards the pump chamber by a seal; and
    a leak detector positioned in or on a seal adaptor that connects the pump cylinder to the drive housing so that the leak detector may capture leaked drive fluid that is leaking from the drive adjacent the seal adaptor and prevent the leaked drive fluid from entering the pump chamber, the leak detector operable to generate an alarm when the leaked drive fluid reaches a threshold, wherein the pump cylinder is formed between the drive housing and a separable end cap that is rigidly attached to the seal adaptor.

2. The pump of claim 1, wherein the pump is a hydraulically actuated pump and the drive fluid is hydraulic fluid.

3. The pump of claim 1, wherein the pump is an electrically actuated pump and the drive fluid is oil.

4. The pump of claim 1, wherein the drive fluid is oil and the drive includes an actuator submerged in oil.

5. The pump of claim 1, wherein the piston is coupled to the drive via a drive rod, the seal is positioned around the drive rod, and an inner surface of the seal adaptor surrounds the seal so that at least a portion of the leaked drive fluid flows into the leak detector via the inner surface of the seal adaptor.

6. The pump of claim 1, wherein the leak detector is connected to a controller operable to receive the alarm and stop the drive to prevent additional fluid from entering the leak detector or the pump chamber and contaminating the pump.

7. The pump of claim 1, wherein the leak detector comprises:
    a buffer tube to collect the leaked drive fluid;
    a sensor to detect a level of the leaked drive fluid in the buffer tube; and
    a purge line to remove the leaked drive fluid from the buffer tube once the leaked drive fluid reaches a maximum level.

8. The pump of claim 7, wherein the sensor is a capacitive sensor, the capacitive sensor generating a signal when the drive fluid reaches the maximum level.

9. A liquid leak detector for a pump comprising:
    a buffer tube positioned in or on a seal adaptor so that the buffer tube may collect a leaked drive fluid from the pump adjacent the seal adaptor, the seal adaptor connecting a pump cylinder of the pump to a drive housing of the pump, and the pump cylinder being formed between the drive housing and a separable end cap that is rigidly attached to the seal adaptor, wherein the drive housing houses a drive fluid and a drive that drives a piston through the pump cylinder to pump a working fluid through a pump chamber of the pump;
    a sensor positioned on the buffer tube to detect a level of the leaked drive fluid in the buffer tube and to generate a signal when the leaked drive fluid reaches a maximum fluid level;
    a purge line to remove the leaked drive fluid from the buffer tube once the leaked drive fluid reaches the maximum fluid level; and
    logic configured to receive the signal and generate an alarm.

10. The liquid leak detector of claim 9, wherein the leaked drive fluid is oil.

11. The liquid leak detector of claim 9, wherein the leaked drive fluid is hydraulic fluid.

12. The liquid leak detector of claim 9, wherein the maximum fluid level is adjustable by adjusting a position of the sensor on the buffer tube.

13. The liquid leak detector of claim 9, wherein the maximum fluid level is adjustable by adjusting a position of the purge line on the buffer tube.

14. The liquid leak detector of claim 9, wherein the sensor is a capacitive sensor.

15. The liquid leak detector of claim 14, wherein the capacitive sensor is connected to a controller that is operable to execute the logic to:

receive the signal and generate the alarm; and stop the drive to prevent additional fluid from entering the buffer tube or the pump chamber and contaminating the pump.

16. A two-stage pump comprising:

a first pump cylinder comprising:

a first pump chamber comprising a first inlet and a first outlet, and a first piston actuatable within the first pump cylinder, wherein the first piston is configured to draw a working fluid into the first pump chamber through the first inlet and to push the working fluid out of the first pump chamber through the first outlet;

a second pump cylinder comprising:

a second pump chamber comprising a second inlet and a second outlet, the second inlet being fluidly coupled to the first outlet; and a second piston actuatable within the second pump cylinder, wherein the second piston is configured to draw the working fluid into the second pump chamber through the second inlet and to push the working fluid out of the second pump chamber through the second outlet;

a drive configured to move the first piston and the second piston, wherein the drive includes a drive housing that houses a drive fluid, the drive fluid prevented from exiting the drive housing towards the first pump chamber by a first seal and the drive fluid prevented from exiting the drive housing towards the second pump chamber by a second seal;

a first leak detector positioned in or on a first seal adaptor that connects the first pump cylinder to the drive housing so that the first leak detector may capture the drive fluid that is leaking from the drive via the first seal adjacent the first seal adaptor and prevent the drive fluid from entering the first pump chamber, the first leak detector operable to generate an alarm when the drive fluid captured by the first leak detector reaches a first threshold, wherein the first pump cylinder is formed between the drive housing and a first end cap that is rigidly attached to the first seal adaptor; and a second leak detector positioned in or on a second seal adaptor that connects the second pump cylinder to the drive housing so that the second leak detector may capture the drive fluid that is leaking from the drive via the second seal adjacent the second seal adaptor and prevent the drive fluid from entering the second pump chamber, the second leak detector operable to generate an alarm when the drive fluid captured by the second leak detector reaches a second threshold, wherein the second pump cylinder is formed between the drive housing and a second end cap that is rigidly attached to the first seal adaptor.

17. The two-stage pump of claim 16, wherein:

the first piston is a low-pressure piston;

the first pump cylinder is a low-pressure cylinder;

the second piston is a high-pressure piston; and the second pump cylinder is a high-pressure cylinder.

18. The two-stage pump of claim 16, wherein:

the first piston is coupled to the drive via a first drive rod;

the first seal is positioned around the first drive rod;

the second piston is coupled to the drive via a second drive rod; and the second seal is positioned around the second drive rod.

19. The two-stage pump of claim 16, wherein:

an inner surface of the first seal adaptor surrounds the first seal so that at least a portion of the drive fluid leaking through the first seal flows into the first leak detector via the inner surface of the first seal adaptor; and an inner surface of the second seal adaptor surrounds the second seal so that at least a portion of the drive fluid leaking through the second seal flows into the second leak detector via the inner surface of the second seal adaptor.

20. The two-stage pump of claim 16, wherein the first end cap is separable from the first cylinder and the second end cap is separable from the second cylinder.

* * * * *